United States Patent [19]

Eversole

[11] 3,801,213

[45] Apr. 2, 1974

[54] ADJUSTABLE DOVETAIL BORING BAR

[75] Inventor: William C. Eversole, Latrobe, Pa.

[73] Assignee: Kennametal Inc., Latrobe, Pa.

[22] Filed: May 25, 1972

[21] Appl. No.: 257,051

Related U.S. Application Data

[63] Continuation-in-part of Ser. No. 89,186, Nov. 13, 1970, abandoned.

[52] U.S. Cl. .................................. 408/181, 408/185
[51] Int. Cl. .......................... B23b 29/34, B23q 3/12
[58] Field of Search ............ 408/153, 156, 181, 185

[56] References Cited
UNITED STATES PATENTS 3,704,958  12/1972  Gulibon et al. ..................... 408/181
2,034,453   3/1936  Wiener ............................ 408/181 X
1,287,971  12/1918  Groff .............................. 408/181 X
3,433,104   3/1969  Milewski et al. ..................... 408/156

Primary Examiner—Francis S. Husar
Attorney, Agent, or Firm—Melvin A. Crosby

[57] ABSTRACT

The specification discloses a boring bar having shanks with a head mounted on one end and with a dovetail tongue and groove connecting the head to the shank. A clamp screw extending through the groove and also through the tongue is provided for clamping the shank and the head together.

9 Claims, 4 Drawing Figures

PATENTED APR 2 1974  3,801,213

INVENTOR.
WILLIAM C. EVERSOLE
BY
Melvin R. Crosby

ADJUSTABLE DOVETAIL BORING BAR

This application is a continuation of my prior application, Ser. No. 89,186, filed Nov. 13, 1970, and abandoned simultaneously with the filing of the present application.

The present invention relates to boring bars and is particularly concerned with a boring bar having an adjustable head, especially a head which is radially adjustable.

Boring bars having adjustable heads are known but, heretofore, have been somewhat expensive to manufacture and have been lacking in the support of the head on the shank of the bar. For the reason that the head was not extremely rigidly supported on the shank, such boring bars have generally been used only for taking relatively light cuts.

Still further, such bars have sometimes been provided with safety inter-locks between the heads and shanks thereof to prevent the head from accidentally becoming disengaged from the shank in case the machine operator should forget to tighten up the clamp screw, or in case of the clamp screw breaking, or by reason of some other fault occuring in respect of the clamping of the head to the shank.

With the foregoing in mind, the primary object of the present invention is the provision of a boring bar with a shank and a head thereon which is adjustable laterally relative to the axis of the shank in which the head is extremely solidly supported on the shank while the head is positively prevented from becoming disengaged from the shank by the same screw which effects the clamping up operation.

Another object of the present invention is the provision of an adjustable head boring bar structure which is relatively inexpensive to manufacture.

Still another object of the present invention is the provision of a boring bar of the nature referred to which permits relatively heavy cuts to be taken by a cutting insert carried by the head without any danger that the head will shift or deflect on the boring bar.

These and other objects and advantages of the present invention will become more apparent upon reference to the following detailed specification taken in connection with the accompanying drawings in which.

BRIEF SUMMARY OF THE INVENTION

Figure 1:
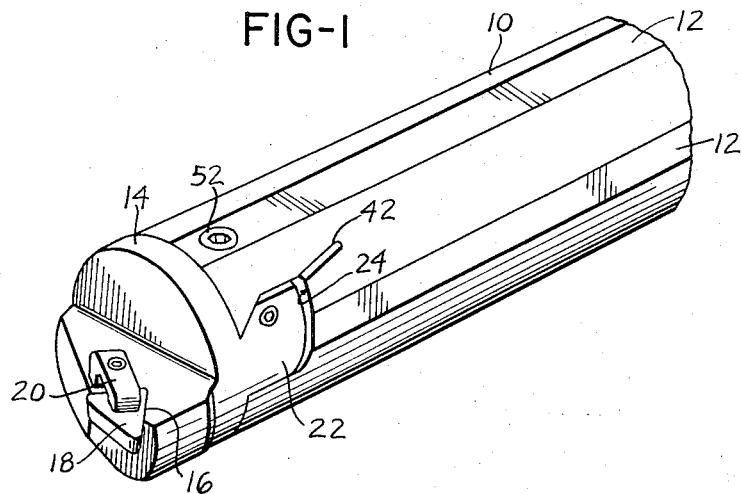
FIG. 1 is a perspective view showing a boring bar with adjustable head according to the present invention.

The present invention relates to a boring bar having a radially adjustable head thereon. The adjustable head is connected to the boring bar by way of a dovetail having a relatively wide angle and a screw is provided for clamping the boring bar part of the dovetail connection to the part of the connection carried by the boring head and is arranged to extend directly through the dovetail portion carried by the adjustable head thereby providing for great strength and rigidity of connection of the head to the boring bar and eliminating the possibility of the head becoming disengaged from the boring bar during use.

DETAILED DESCRIPTION

Referring to the drawings somewhat more in detail, the boring bar illustrated therein comprises a shank portion 10 which is an elongated generally cylindrical member adapted for being clamped in a suitable support therefor in a machine tool. The work may rotate relative to the boring bar or the boring bar may be rotated relative to the work. The boring bar illustrated is adapted for either type of operation. Shank 10 preferably has flats 12 formed thereon and extending longitudinally of the shank and providing convenient surfaces for nonrotatably clamping the shank fixedly to the support therefor.

At the one end, shank 10 carries a head 14 which has a pocket 16 in which a cutting insert 18 is clamped as by a top clamp member 20.

The head 14 on the side thereof facing the shank 10 is flat and is provided with a rearwardly protruding lateral extension on tongue 22 adapted for being slidably received in a lateral slot or groove 24 in the adjacent end of shank 10. Tongue 22 advantageously has an axially extending planar bottom surface 26, a diametral rear surface 28 and a top surface which comprises an axial portion 30 remove from the head and an inclined portion 32 adjacent the head. The tongue 22 is thus in the form of a one-sided dovetail having an inclined surface on only one side thereof.

Shank 10 has a flat end thereon into which a diametral groove 24 is formed. The groove 24 in shank 10, similarly to tongue 22, has a bottom axially extending planar surface 34, a diametral rear surface 36, and a top surface comprising the axially extending portion 38 remote from the end of the shank and the inclined front part 40 adjacent the end of the shank and which is complementary to portion 32 of the top wall of tongue 22 on the head 14.

The boring bar, furthermore, includes a slot 42 extending generally axially of the boring bar from the bottom of groove 24 preferably at or near the juncture of the back wall 36 and portion 38 of the top wall of the groove 24 in the shank 10 of the boring bar. Slot 42 could be located anywhere along the back wall of groove 24 but is advantageously located as shown near the juncture of the aforementioned back wall and top wall portion of the groove for the reason that this location of the slot imparts the best action to the clamping up operation and likewise results in the strongest construction.

According to the present invention, the interengaging dovetail surfaces 32 and 40 are inclined at an angle of about 45 degrees to the axis of shank 10, although it will be understood that this angle could vary substantially within the purview of the present invention. The important thing about the angle of the inclined surfaces is that when the assembly is clamped together, the head be drawn toward the shank so the flat side of the head will firmly engage the flat end of the shank so the head will be exactly located and will be held against yielding, even under fairly high loads.

The flat end of shank 10 referred to is a planar end surface 44 and the flat side of the head 14 referred to facing shank 10 is a planar surface 46 for engagement with surface 44.

According to the present invention, the tongue 22 on the head of the boring bar is provided with a laterally elongated hole 48 to receive a clamp bolt 50 with clearance. Hole 48 could be in the form of a recess extending into said tongue from the rear end but is preferably in the form of a hole to keep the tongue as strong as possible.

Figure 2:
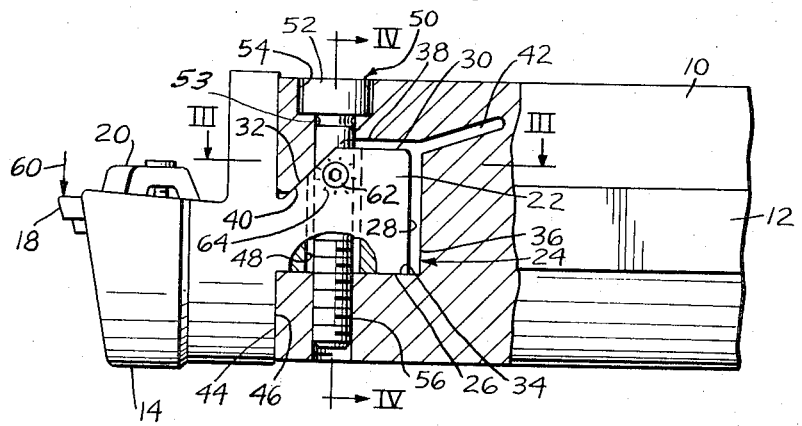
FIG. 2 is a side view of the boring bar and cutting head partly broken away.
Figure 4:
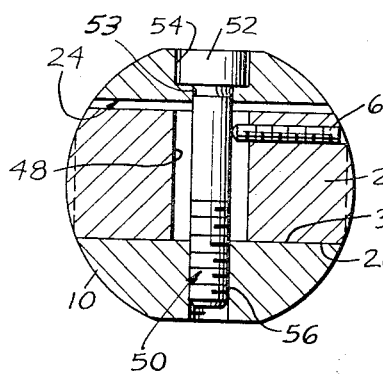
FIG. 4 is a transverse vertical sectional view indicated by line IV—IV on FIG. 2.
Figure 3:
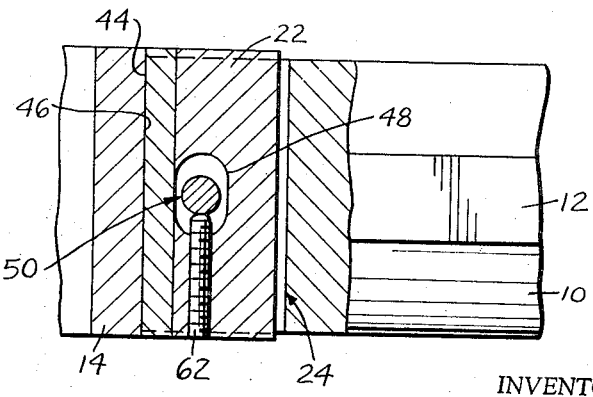
FIG. 3 is a plan sectional view indicated by line III—III on FIG. 2.

Clamp bolt 50, as will best be seen in FIGS. 2 and 4, has a head 52 receivable in a recess 54 provided therefor in the shank 10 in the region of the end of shank 10 adjacent head 14. Recess 54 is coaxial with a bore 56 in the shank which is threaded for receiving the threaded end of screw 50.

The location of screw 50 is of particular merit because it acts directly in the vicinity of the transverse plane of the inclined surfaces 32 and 40 and is thereby highly effective for drawing these surfaces tightly together, and, furthermore, for holding the surfaces in firm engagement once the screw has been tightened up.

Still further, the screw 50 passes through hole 48 with clearance and this is of particular merit because, if it should happen that the machine operator inadvertently forgets to tighten up the clamping screw, the head 14 cannot be thrown off from the shank 10 even when the boring bar is of the rotating type.

As mentioned, the screw holds the assembly tightly clamped together and this is of importance because it permits relatively heavy cuts to be taken by a boring bar according to the present invention without the load imposed on the insert carried by the head causing any tilting of the head on shank 10.

If the screw 50 were to be located rearwardly along a shank from head 14, as is the case in respect of certain other known types of adjustable head boring bars, one thereof being shown in the U.S. Pat. No. 3,433,104, there would be sufficient resilience in the assembly to permit the head to tilt under extremely heavy loads and this is, of course, highly objectionable.

The location of slot 42 near the top of the back wall of the groove in the end of shank 10 is important because the lower part of the boring bar remains a solid mass of metal and is, thus, in the best possible condition to sustain any thrusts imposed on the insert carried by the cutting head.

Assuming that the principal load on the cutting insert is downwardly as indicated by arrow 60 in FIG. 2, it will be evident that the tang on the top of the boring bar formed by the notch 42 and including at its outer end the wedge shaped portion that fits in the dovetail formed on the tongue 22 of the head, the said tang will be principally in tension while the surfaces 44 and 46 toward the bottom of head 14 will be placed principally in compression.

The disclosed arrangement thus forms an extremely strong and solid mounting for the head 14 of the boring bar and, furthermore, eliminates the possibility of injury to the shank 10 in the case of sudden shock loading on the head as can sometimes occur during machining operations when an insert breaks or when certain other unexpected events occur.

The invention also proposes the provision of an adjustment screw 62 extending laterally into tongue 22 in the plane in which screw 50 is located. The region of the tongue 22 immediately surrounding the hole for screw 62 may have indicia 64 thereon so the amount of rotation of the screw and, therefore, the amount of adjustment laterally of head 14 on shank 10 can be determined.

It would be possible, of course, to include a further adjusting screw extending into tongue 22 from the opposite side of screw 62, if so desired, but in most cases, a single adjusting screw is adequate for effecting radial adjustment of head 14 on shank 10.

Inasmuch as the clamp screw extending through the groove and tongue also represents a safety feature inasmuch as it prevents the head from becoming disengaged from the shank, it is possible further to enhance the safety aspect of the arrangement by providing a slightly weakened region in the clamp screw adjacent the head end, as shown at 53, so that if the clamp screw should, for any reason, become stressed to the point of breaking, the fracture will occur at the weakened region of the screw thereby leaving in the shank that portion of the screw extending into the tongue on the head so that the head will be held on the shank till the machine can be brought to a halt and suitable repairs made in the boring bar, or the boring bar replaced by another.

Modifications may be made within the scope of the appended claims.

What is claimed is:

1. A boring bar comprising an elongated shank having a longitudinal axis, a separable head at one end of said shank adapted for supporting a cutting insert, said shank and head having respective opposed flat surfaces perpendicular to the longitudinal axis of said shank, a groove formed in one of the side of said head facing said one end of said shank and the said one end of said shank and a tongue on the other thereof closely fitted into said groove, said tongue and groove extending in the diametral direction of said shank and substantially at right angles to the longitudinal axis of said shank, a clamp screw in the one of said shank and head having the groove formed therein and extending at right angles to the longitudinal axis of said shank and to said diametral direction and also extending through said tongue, said tongue having an opening receiving said clamp screw and elongated in said diametral direction, threaded means operatively interposed between said head and shank and acting in said diametral direction and adjustable for effecting adjustment of said head and shank relatively in said diametral direction, said tongue being of substantial size in cross section, one side wall of said tongue and the one side wall of said groove which is adjacent thereto being planar and parallel to the longitudinal axis of said shank, the other side wall of said tongue comprising a first portion adjacent the respective flat surface which is inclined so as to diverge from the longitudinal axis of said shank in a direction away from said respective flat surface and a second portion remote from said respective flat surface which is parallel to the longitudinal axis of said shank, the other side wall of said groove having a first portion parallel to said first portion of the other side wall of said tongue for engagement therewith when said clamp screw is tightened and a second portion substantially parallel to said second portion of the other side wall of said tongue and spaced therefrom when said clamp screw is tightened, the bottom wall of said tongue which faces the bottom wall of said groove being spaced from the bottom wall of the groove when the said opposed flat surface on said head and said shank are interengaged.

2. A boring bar according to claim 1 in which the one of said shank and head having the groove formed therein includes a slot extending from the bottom wall of said groove generally in the longitudinal direction of said shank.

3. A boring bar according to claim 1 in which said groove is formed in said shank and said tongue is on said head.

4. A boring bar according to claim 1 in which said head on the side thereof which faces away from said one end of said shank comprises a pocket formed therein for receiving an insert, said pocket having a bottom wall on which an insert placed therein rests and disposed substantially in a plane extending parallel to said longitudinal axis of said shank and also parallel to said diametral direction.

5. A boring bar according to claim 3 which includes a transverse slot formed in said shank and extending generally axially thereof from the bottom wall of said groove in a direction away from said one end of said shank.

6. A boring bar according to claim 5 in which said slot is located near the juncture of the said bottom wall of said groove with the said second portion of said other side wall of the groove.

7. A boring bar according to claim 1 in which the side of said head which faces away from said shank is formed with a pocket to receive a cutting insert, said pocket having a bottom wall on which an insert disposed in the pocket is supported, said bottom wall of said pocket being disposed in a plane substantially parallel to the longitudinal axis of said shank and to said diametral direction, said bottom wall of said pocket facing away from the said one side wall of said tongue, whereby an insert mounted in said pocket and presented a cutting edge to a work member will have the principal load thereon directed toward the said one side of said tongue and groove.

8. A boring bar according to claim 1 in which the angle between the plane of the said flat surface on said head and the plane of said first portion of said other side wall of said tongue is about 45°.

9. A boring bar according to claim 1 in which said clamp screw comprises a weakened region near the head.

* * * * *